Aug. 28, 1934.   W. F. PARKER   1,971,577
SCOOP OR LADLE
Filed Nov. 5, 1932

INVENTOR.
Walter F. Parker
BY Robt. O. Pearson
ATTORNEYS.

Patented Aug. 28, 1934

1,971,577

UNITED STATES PATENT OFFICE 1,971,577

SCOOP OR LADLE

Walter F. Parker, Los Angeles, Calif., assignor of one-half to Henry Youngquist, Los Angeles, Calif.

Application November 5, 1932, Serial No. 641,453

2 Claims. (Cl. 219—21)

This invention relates to a ladle or scoop provided with heating means.

The invention relates more particularly to an ice cream scoop furnished with means whereby it may be electrically heated so as to facilitate the penetration of the ice cream with the edge of the scoop, and also to prevent the ice cream adhering to the scoop when it is to be emptied. The invention is by no means limited to such use but is applicable to scoops or ladles in general for the purpose of heating the contents of such a utensil or for the purpose of preventing congealed material from adhering thereto.

By the use of modern refrigeration it frequently occurs that the contents of the refrigerator is maintained at so low a temperature that ice cream or other frozen confections are solidified to such an extent that it is difficult to handle the congealed substances by means of ordinary scoops or ladles. By this invention a scoop or ladle is provided the containing portion of which is provided with a relatively sharp lip and the scoop is also electrically heated so that the lip portion thereof will readily cut into the substance to be dipped out.

The invention also comprises, in combination with other features, the provision of improved means for controlling the degree of temperature to which the ladle is heated and for safeguarding against the heating element or the operator being injured by excessive electrical current.

Other objects, advantages and features of the invention may hereinafter appear.

Referring to the accompanying drawing which illustrates what is at present deemed to be a preferred embodiment of the invention, Fig. 1 is a longitudinal midsection of the complete device.

Figure 1:
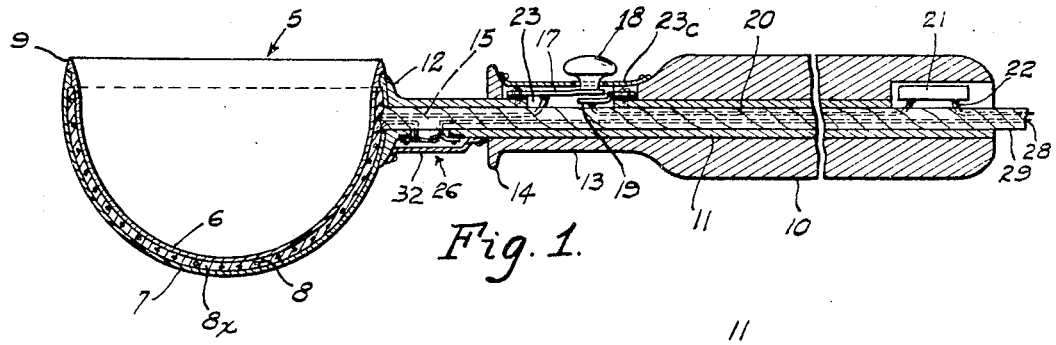
Figure 3:
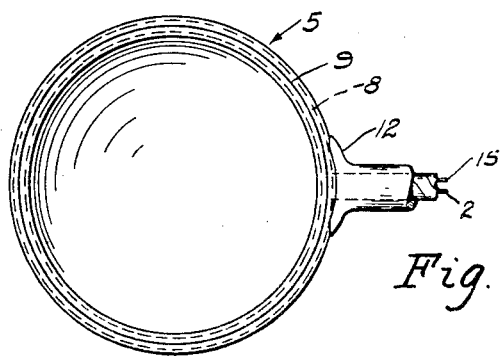
Fig. 3 is a sectional detail illustrating on an enlarged scale the thermostatic control.
Figure 2:
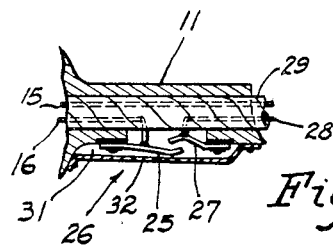
Fig. 2 is a top plan view of the bowl portion thereof.

Referring in detail to the drawing, the ladle bowl 5 shown in the drawing is of the semi-spherical type having an internal wall 6 and an external wall 7. Said walls 6 and 7 being uniformly spaced apart, provide room between them for the heating element 8. Around the mouth of the ladle said walls 6 and 7 join each other at an acute angle thus forming a cutting lip or knife edge portion 9. The handle portion of the device comprises an external or body part 10 through which extends a rod or core portion 11, the front end of which is preferably flared or externally flanged at 12 where it is, by any suitable means, secured to the bowl 5. The handle body 10 may consist of bakelite or other non-conducting material, and the inside member 11 may be made of metal or other relatively strong material which need not extend completely through the handle body 10 but should project sufficiently far thereinto to form a strong, dependable construction. The cylindrical handle body 10 is shown provided with a diametrically reduced inner end portion 13 which terminates in an outwardly projecting peripheral flanged part 14.

The wire heating element 8 is shown embedded in insulating material 8x. It is supplied with electric current through the leads 15 and 16, the lead 15 being connected with a switch element 17, preferably a spring member which is depressible by the button 18 carried at its free end. The depression of said button brings the switch element 17 into contact with the terminal 19 of the lead 20, said lead 20 being in turn connected by the fuse 21 with the supply lead 22. The reduced portion 13 of the handle is chambered at 23 to provide room for the switch arm 17 and its button 18. The chamber 23 is shown provided with a cover plate 23c which is apertured to provide for mounting the button 18 in an operative position upon the spring arm 17. Said cover plate protects the switch from accidentally being moistened by any liquid or semi-liquid material which it may be necessary to handle with the ladle.

The lead 16 already referred to is electrically connected with the bi-metallic thermostatic arm 25 of the thermostatic device 26, there being a terminal 27 with which said bi-metallic arm co-operates. Said terminal 27 is supplied by current from the line 2, and line wires 22 and 28 are encased within the cord 29 which has a plug-in device, not shown, to connect it with any suitable electric fixture.

Figure 4:
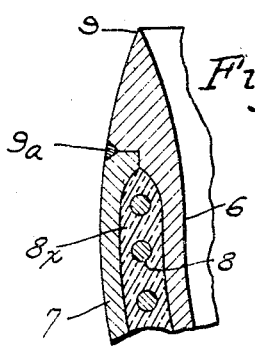
Fig. 4 is a sectional detail illustrating on an enlarged scale the construction of a portion of the bowl of the ladle.

Referring to certain details of construction, in Fig. 4 the lip portion 9 of the bowl is shown as an upward continuation of the inner wall 6 thereof, and the outer wall 7 is shown bevelled around the outer side of its upper edge to receive a ring of solder 9a, said bevel not extending across the entire width of the wall 7 but leaving a shoulder or flat area 9s against which the lower side of the triangular lip portion 9 may rest in order to properly support the inner wall 6 of the bowl preparatory to supplying the solder ring 9a. The lip portion 9 is bevelled to correspond with the adjacent part of the wall 7 in order to provide a wider space for the reception of the solder or other welding element 9a.

The thermostatic device 26 is housed within a chamber 31, which is covered by means of a plate 32, thus protecting the thermostat from moisture and mechanical injury. Owing to the thermostat being located close to the bowl 5 and its heating element 8, the heat is conducted quickly from the bowl to the thermostat thereby insuring its efficient operation.

Figure 5:
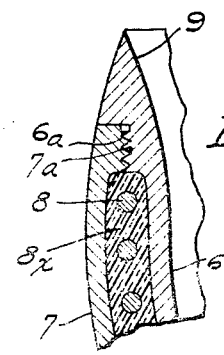
Fig. 5 is a like sectional detail illustrating a modified construction for the ladle bowl.

In Fig. 5 is shown a modification wherein the lip portion of the outer wall 7 is provided with internal screw threads 7a and the marginal portion of the inner wall 6 adjacent to the cutting lip thereof is provided with external screw threads 6a in order that the internal member of the ladle may be screwed into place after the heating element has been inserted. By this construction a concavo-convex space of uniform width is provided between the outer and inner portions of the bowl of the ladle, which space is adapted to receive the heating element 8 and hold it in a proper operative position. The convenient assembling of the heater and adjacent bowl sections is also thus provided for.

In using both forms of the device, the heated knife edge portion 9 will readily cut into the ice cream or other substance to be dipped up, even when this substance is hardened by congealing. The heated condition of the sharp edge makes it cut more readily into the congealed substance.

I claim:

1. In a device of the kind described, a bowl consisting of an inner wall section and an outer wall section, both of said wall sections being substantially semi-spherical shells, said wall sections having a screw threaded connection with each other adjacent to the lip of the bowl thus adapting them to be secured together to form a housing for a heating element, said wall sections being shaped to provide a concavo-convex space between them, and a heating element housed within said space, the bowl having a cutting edge to penetrate the substance being handled, said cutting edge being in spaced relation to the screw threaded connection between said inner and outer wall sections.

2. In a device of the kind described, a bowl consisting of a partly spherical inner wall portion and a correspondingly shaped outer wall portion, one of said wall portions forming the lip portion of the bowl and being provided with a shoulder adjacent to said lip portion which extends over the edge of the other wall portion, there being an annular space along said shoulder, a ring of solder occupying said space to secure said wall portions of the bowl to each other, an electric heating element occupying the space between said wall portions, and manually controllable means to supply electric current to said heating element to heat the bowl.

WALTER F. PARKER.